W. B. TWIFORD.
Dumping-Wagon.
No. 25,062.
2 Sheets—Sheet 1.
Patented Aug. 9, 1859
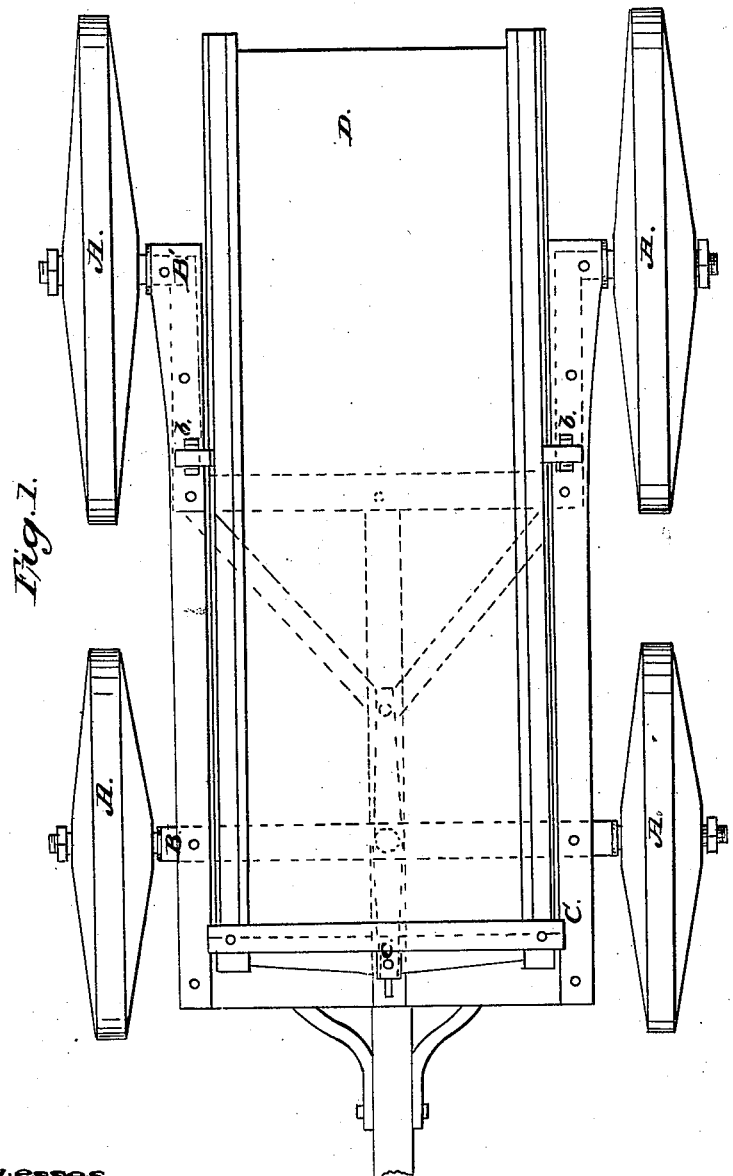

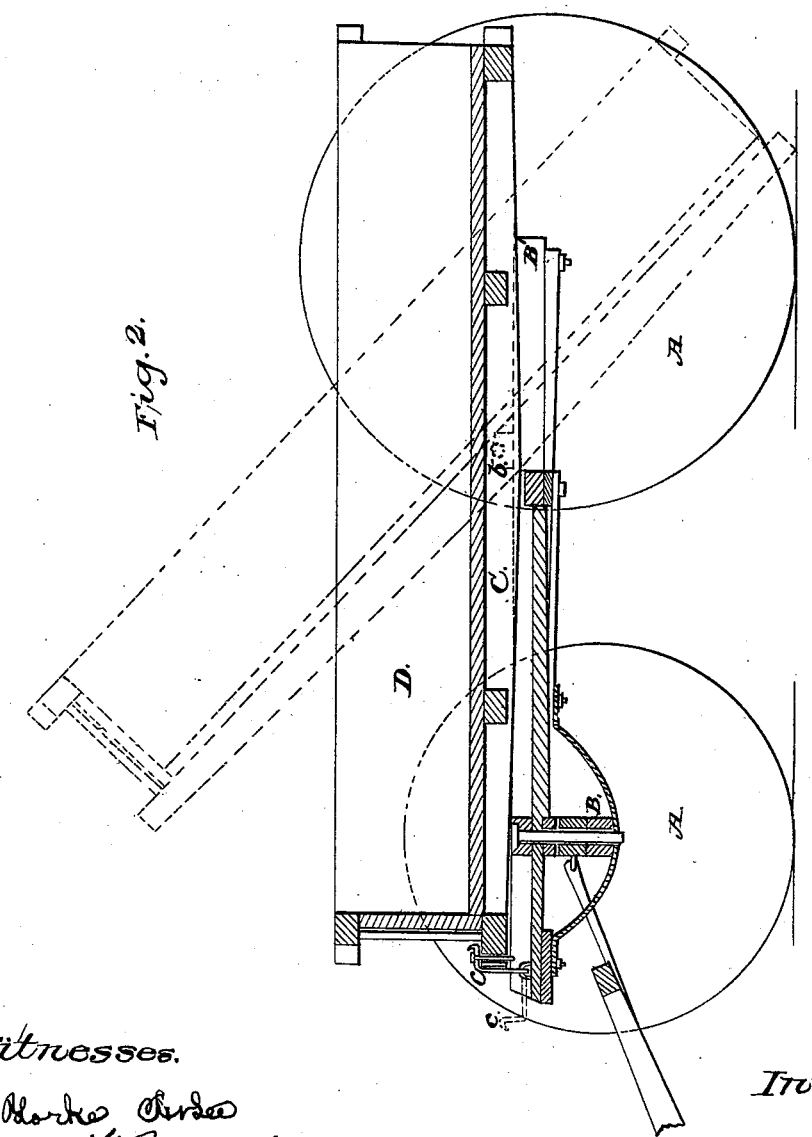

UNITED STATES PATENT OFFICE.

WILLIAM B. TWIFORD, OF CHINCOTEAGUE, VIRGINIA.

DUMPING-WAGON.

Specification of Letters Patent No. 25,062, dated August 9, 1859.

*To all whom it may concern:*

Be it known that I, WM. B. TWIFORD, of Chincoteague, in the county of Accomac and State of Virginia, have invented a new and useful Improvement in Dumping-Wagons; and I do hereby declare that the following is a full, clear, and exact description of the same, reference being had to the accompanying drawings, forming a part of this specification, in which—

Figure 1, is a plan or top view of a dumping car with my improvements applied to it. Fig. 2, is a vertical longitudinal section of the same.

Similar letters of reference, in each of the several figures, indicate corresponding parts.

My invention relates to four wheeled dumping wagons and is designed to obviate the necessity of using the turning crank axle exhibited in the dumping wagon patented to me on the 28th day of October 1856.

The nature of my invention consists in an open frame which has no rear end piece, and is adapted for having four wheels hung to it; in combination with a crank axle which is made stationary with said frame and arranged so that it braces the frame near the center of its length and yet provides journals near the ends of the side pieces for the said wheels to turn upon; and with a wagon-body which works freely between the side pieces of the frame and is pivoted to the same at a point near the center of its length, all substantially as hereinafter described. By this arrangement, an open space is left in the frame beyond the axis on which the body swings for the hind end of the body to move or descend through when the front end is elevated. This construction is more permanent than my patented device and is also much simpler and cheaper.

To enable others, skilled in the art, to make and use my invention, I will proceed to describe its construction and operation.

A, A, A, A, represents the wheels; B, B', the axles; C, C, the frame and D, the body of the wagon.

The axle B', is bent in the form of a crank, and terminates in two short journals $a, a$, which serve for the hind wheels to turn upon, as shown in the drawing. The short journals $a, a$, pass through the extreme rear ends of the frame C, C, while the crank portion extends forward nearly to the center of the frame so as to leave a free, open space in the rear of the center of the body for the rear end of the body to descend through when the front end is elevated as shown in red in Fig. 2.

The body D, is hinged to the frame C, C, at $b, b$, so as to be dumped, as just described. At its forward end a catch $c$, is provided to hold the body down while it is being loaded and the load being transported to its place of destination. This catch is confined by a bolt which may be provided with a chain or lever so as to be readily and conveniently withdrawn. The red lines in Fig. 2, show the catch thrown out of operation and the wagon body as it appears while the load is being dumped.

I do not claim, at this date, the combination of a crank axle which revolves with the wagon body, as a patent was granted to me for this device on the 28th day of Oct. 1856, but What I now claim as my invention and desire to secure by Letters Patent, is—

The three sided, four wheel, open frame C, stationary crank axle B, and long wagon body D, when constructed and arranged for operating together in the manner and for the purpose herein described.

The above specification of my improvement in dumping wagons signed by me this 15th day of March 1859.

WM. B. TWIFORD.

Witnesses:
G. YORKE AT LEE,
GEORGE W. ADAMS.